(12) United States Patent
Yamada et al.

(10) Patent No.: US 6,489,057 B1
(45) Date of Patent: Dec. 3, 2002

(54) POSITIVE ELECTRODE-ACTIVE MATERIAL AND LITHIUM CELL COMPRISING THE SAME

(75) Inventors: Masayuki Yamada, Ibaraki (JP); Shigeo Aoyama, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 14 days.

(21) Appl. No.: 09/686,091

(22) Filed: Oct. 12, 2000

(30) Foreign Application Priority Data

Oct. 12, 1999 (JP) .......................................... 11-289156
Oct. 12, 1999 (JP) .......................................... 11-289164
Jan. 14, 2000 (JP) ....................................... 2000-006471

(51) Int. Cl.$^7$ ................................................ H01M 4/36
(52) U.S. Cl. ................... 429/220; 429/218.1; 429/221; 429/223; 429/224; 429/231.5
(58) Field of Search ............................. 429/220, 218.1, 429/221, 223, 224, 231.5

(56) References Cited

U.S. PATENT DOCUMENTS 4,292,382 A * 9/1981 Lecerf et al. ............... 429/220
4,444,857 A * 4/1984 Duchange et al. .......... 429/199
5,001,023 A * 3/1991 Cheshire et al. ........... 29/623.5
5,547,785 A * 8/1996 Yumiba et al. ............. 429/220

FOREIGN PATENT DOCUMENTS

JP  2-267861  * 11/1990
JP  3-271365  * 12/1991

* cited by examiner

*Primary Examiner*—Laura Weiner
(74) *Attorney, Agent, or Firm*—Birch, Stewart, Kolasch & Birch, LLP

(57) ABSTRACT

A copper-boron double oxide of the formula: $Cu_jM_kB_mO_n$ in which M is a metal atom, and j, k, m and n are each a positive integer, a copper-molybdenum double oxide of the formula: $Cu_xMo_yO_z$ in which x, y and z are each a positive integer, or a copper double oxide of the formula: $CuM'_2O_4$ in which M' is at least one element selected from the group consisting of B, Al, Ga, Mn, Co, Ni and a rare earth element is useful as a positive electrode-active material of a lithium secondary cell.

6 Claims, 3 Drawing Sheets

POSITIVE ELECTRODE-ACTIVE MATERIAL AND LITHIUM CELL COMPRISING THE SAME

BACKGROUND OF THE INVENTION

1. Field of the Invention

The present invention relates to an active material for a positive electrode (positive electrode-active material) and a lithium cell comprising the same. In particular, the present invention relates to a positive electrode-active material with a high voltage and a high capacity and a lithium cell comprising the same.

2. Prior Art

Hitherto, a lithium cell comprising copper oxide (CuO) as a positive electrode-active material (hereinafter referred to as a "Li/CuO" cell) has been proposed as a lithium cell having a high capacity density (see Brounssely M., Jumel Y. and Cabano J. P., $152^{nd}$ Electrochemical Society Meeting, Atlanta (1977)).

However, the Li/CuO cell has a low closed circuit voltage of about 1.2 to 1.5 V, and thus it cannot be used in applications which require a high voltage.

SUMMARY OF THE INVENTION

One object of the present invention is to provide a positive electrode-active material which can achieve a high voltage without decreasing the capacity, and a lithium cell comprising such a positive electrode-active material.

Accordingly, the present invention provides a positive electrode-active material consisting of at least one compound selected from the group consisting of a copper-boron double oxide of the formula:

$$Cu_jM_kB_mO_n \qquad (I)$$

wherein M is a metal atom, and j, k, m and n are each a positive integer, a copper-molybdenum double oxide of the formula:

$$Cu_xMo_yO_z \qquad (II)$$

wherein x, y and z are each a positive integer, and a copper double oxide of the formula:

$$CuM'_2O_4 \qquad (III)$$

wherein M' is at least one element selected from the group consisting of B, Al, Ga, Mn, Co, Ni and a rare earth element Ln (for example, Y, La, etc.)

Furthermore, the present invention provides a lithium cell comprising a positive electrode comprising the above active material of the present invention, a lithium negative electrode, and an electrolyte solution.

In the lithium cell of the present invention, for example, a $Li/Cu_2FeBO_5$ cell, unlike the conventional Li/CuO cell, the circumstance around the reducing copper atom of $Cu_2FeBO_5$ is different from that of CuO, and thus the distance of the Cu-O bond varies. In addition, the Cu atom is bonded with Fe and B. Therefore, the lattice energy is increased. It is known that the increase of a lattice energy and the variation of the distance between a reducing atom and the nearest atom increase a discharge voltage (Masayuki Yoshio and Akiya Ozawa Ed., "Lithium Ion Secondary Cells", page 8 (published by Nikkan Kogyo Shinbunsha), 1996).

In the synthesis of the positive electrode-active material such as $Cu_2FeBO_5$, $CuB_2O_4$, $Cu_3Mo_2O_9$, etc., since $B_2O_3$, $H_3BO_3$ or $MoO_3$ having a low melting point is used, $Cu_2FeBO_5$, $CuB_2O_4$ or $Cu_3Mo_2O_9$ of a single phase can be synthesized at a relatively low temperature, and the particles of $Cu_2FeBO_5$, $CuB_2O_4$ or $Cu_3Mo_2O_9$ having a small particle size can be produced by the synthesis at such a low temperature. The use of such $Cu_2FeBO_5$, $CuB_2O_4$ or $Cu_3Mo_2O_9$ having a small particle size as a positive electrode-active material can increase the conductivity of the positive electrode and, in turn, the discharge voltage. In the course of discharging, the $Cu_2FeBO_5$ or $CuB_2O_4$ particles may generate $B_2O_3$ or boron compounds and Fe2O3, and $Cu_3Mo_2O_9$ may generate $MoO_3$, and such generated materials discharge in the range between 1 V and 3 V. Thus, the capacity of the cell further increases. Therefore, in cooperation with the above-described increase of the discharge voltage, a lithium cell having a high voltage and a high capacity can be obtained.

FIGS. 3 and 4 show the discharge characteristics of the cell of Reference Example 1 comprising $B_2O_3$ as a positive electrode-active material, and that of the cell of Reference Example 2 comprising $MoO_3$ as a positive electrode-active material, respectively. From FIGS. 3 and 4, it can be understood that the cells of Reference Examples 1 and 2 discharge at a higher voltage than a cell comprising CuO as a positive electrode-active material, the discharge characteristics of which are shown in FIG. 2.

DETAILED DESCRIPTION OF THE INVENTION

Figure 1:
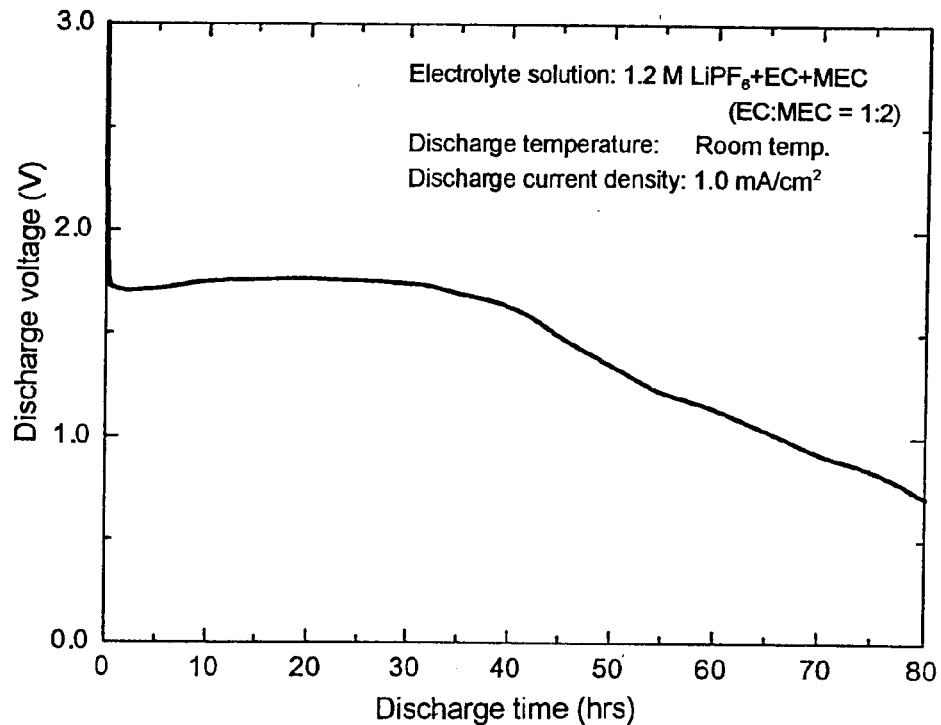
FIG. 1 is a graph showing the discharge characteristics of the cell produced in Example 1 comprising $Cu_2FeBO_5$ as a positive electrode-active material.

In the composition formula (I), M is a metal atom, and preferably at least one metal atom selected from the group consisting of Fe, Al, Ga, In, Tl, Sc, Ln, Ni, Mn and Co wherein Ln is a rare earth element such as Y, La, etc.

In the composition formula (III), M' is at least one metal atom selected from the group consisting of B, Al, Ga, Mn, Co, Ni and a rare earth element Ln (for example, Y, La, etc.)

In the formulae (I) and (II), j, k, m, n, x, y and z are generally each a positive integer of 1 to 20, although they may be an integer exceeding 20.

Specific examples of the copper double oxides of the formula: $Cu_jM_kB_mO_n$, $Cu_xMo_yO_x$ or $CuM'_2O_4$ include $Cu_2FeBO_5$, $Cu_2AlBO_5$, $Cu_2GaBO_5$, $Cu_2Al_6B_4O_{17}$, $Cu_5Y_6B_4O_{20}$, $Cu_3Mo_2O_9$, $CuMoO_4$, $Cu_2MoO_5$, $Cu_6Mo_4O_{15}$, $Cu_2Mo_3O_{10}$, $Cu_4Mo_5O_{17}$, $Cu_6Mo_5O_{18}$, $Cu_4Mo_6O_{20}$, $CuB_2O_4$, $CuMn_2O_4$, $CuAl_2O_4$, $CuGa_2O_4$, $CuNi_2O_4$, etc.

A positive electrode comprises the above positive electrode-active material, a binder (e.g. polytetrafluoroethylene (PTFE), polyvinylidene fluoride (PVdF), etc.), and optionally an electron-conducting aid (e.g. acetylene black, graphite, etc.) and an additional positive electrode-active material for a lithium secondary cell which has a voltage range of 2 V or more with respect to lithium. The positive electrode can be produced by mixing the above materials and molding the mixture by any conventional method.

In the lithium cell of the present invention, any lithium electrode may be used depending on the characteristics required for the cell and the applications of the cell. For example, the negative electrode maybe made from lithium, a lithium alloy such as a lithium-aluminum alloy, or a lithium-containing material such as lithium-carbon. To improve the shelf life, the cell of the present invention may be a negative electrode-limitation cell in which the capacity of the negative electrode is smaller than that of the positive electrode-active material.

In the preparation of the copper double oxide of the formula (I), (II) or (III), sources for elements such as Cu, B, etc., their oxides, halides, carbonates, and the like are preferably used. Also, as the sources of Mo, Fe, Al, Ga, rare earth elements (Ln), Mn, Ni, Co, etc., their oxides, halides, carbonates, and the like are preferably used.

To prepare the copper double oxide of the formula (I), (II) or (III), the raw material powders may be calcined in an air. The calcination temperature is not limited, and is preferably from 500 to 1,200° C. The calcination time is not limited either, and is preferably from several ten minutes to several hours.

The conducting aid used in the preparation of the positive electrode mixture may be any electron-conducting material which does not participate in any chemical reaction in the cell. Specific examples of the conducting aid include natural graphite (e.g. scaly graphite, squamiform graphite, earthy graphite, etc.), synthetic graphite, carbon black, acetylene black, ketchen black, carbon fiber, metal powders (e.g. powders of copper, nickel, aluminum, silver, etc.), metal fiber, polyphenylene derivatives (cf. JP-A-59-20971), etc. They may be used independently or in admixture of two or more of them.

The binder may be a polysaccharide, a thermoplastic resin, a rubbery elastomeric polymer, etc. Specific examples of the binder include starch, polyvinyl alcohol, carboxymethylcellulose, hydroxypropylcellulose, regenerated cellulose, diacetylcellulose, polyvinyl chloride, polyvinylpyrrolidone, polyetetrafluoroethylene, polyvinylidene fluoride, polyethylene, polypropylene, ethylene-propylene-diene terpolymers (EPDM), sulfonated EPDM, styrene-butadiene rubbers, polybutadiene, fulororubbers, polyethylene oxide, etc. They may be used independently or in admixture of two or more of them.

The electrolyte solution may be a solution of a conventional electrolyte in an aprotic organic solvent.

The electrolyte may be a lithium salt such as $LiClO_4$, $LiBF_6$, $LiPF_6$, $LiCF_3SO_3$, $LiCF_3CO_2$, $LiAsF_6$, $LiSbF_6$, $LiB_{10}Cl_{10}$ lithium salts of lower aliphatic carboxylic acids, $LiAlCl_4$, LiCl, LiBr, LiI, chloroborane lithium, lithium tetraphenylborate, etc.

Examples of the organic solvent include propylene carbonate, ethylene carbonate, butylene carbonate, dimethyl carbonate, diethyl carbonate, methyl ethyl carbonate, γ-butyrolactone, 1, 2-dimethoxyethane, tetrahydrofuran, tetrahydrofuran derivatives such as 2-methyltetrahydrofuran, etc., dimethylsulfoxide, 1, 3-dioxolane, formamide, dimethylformamide, dioxolane, acetonitrile, nitromethane, methyl formate, methyl acetate, phosphoric acid triesters, trimethoxymethane, dioxolane derivatives, sulfolane, 3-methyl-2-oxazoline, propylene carbonate derivatives, diethyl ether, 1,3-propanesultone, and mixtures thereof.

Among the electrolyte solutions, the solution of at least one of $LiClO_4$, $LIBF_6$, $LIPF_6$ and $LICF_3SO_3$ dissolved in a mixed solvent of propylene carbonate and at least one of 1,2-dimethoxyethane, diethyl carbonate and methyl ethyl carbonate is particularly preferred.

The concentration of the electrolyte is not limited. In general, the concentration is from 0.2 to 3.0 moles of the electrolyte per one liter of the electrolyte solution.

The amount of the electrolyte solution charged in the cell is not limited, and can be determined according to the amounts of the positive and negative electrode-active materials, and the size of the cell.

The cell of the present invention may be produced by a conventional method for the production of the conventional lithium cell.

EXAMPLES

The present invention will be illustrate by the following Examples, which do not limit the scope of the present invention in any way.

Example 1

Copper oxide (CuO) (60.5 g), iron oxide ($Fe_2O_3$) (30.3 g) and boron oxide ($B_2O_3$) (13.2 g) were mixed and the mixture was calcined in an air at 900° C. for 2 hours. The obtained powder had an average particle size of about 1.0 μm. According to the X-ray diffraction analysis, it was found that the product was $Cu_2FeBO_5$.

The $Cu_2FeBO_5$ powder (48 mg), acetylene black (a conducting aid) (10 mg) and polytetrafluoroethylene powder (a binder) (2 mg) were mixed to obtain a positive electrode mixture. This mixture was charged in a mold and press molded under a pressure of 1 ton/cm² to obtain a disc form positive electrode having a diameter of 10 mm.

A coin type lithium cell having a diameter of 20 mm and a thickness of 1.6 mm was produced using the above positive electrode, a lithium foil as a negative electrode, and an electrolyte solution which contained 1.2 mole/l of $LiPF_6$ dissolved in the mixed solvent of ethylene carbonate and methyl ethyl carbonate in a volume ratio of 1:2.

With the produced cell of Example 1, the discharge characteristics were measured at room temperature at a discharge current of 1.0 mA/cm². The average voltage was 1.75 V, and the discharged amount of electricity was 550 mAh/g (final voltage: 1.0 V).

The discharge characteristics of the cell of Example 1 are shown in FIG. 1.

Example 2

A positive electrode-active material was prepared in the same manner as in Example 1 except that boric acid ($H_3BO_3$) (24.0 g) was used in place of $B_2O_3$ in the raw material of the positive electrode-active material. The obtained powder had an average particle size of about 1.2 μm. According to the X-ray diffraction analysis, it was found that the product was $Cu_2FeBO_5$.

A coin type lithium cell was produced in the same manner as in Example 1 except that $Cu_2FeBO_5$ prepared in the above was used as a positive electrode-active material.

With the produced cell of Example 2, the discharge characteristics were measured under the same conditions as those in Example 1. The average voltage was 1.7 V, and the discharged amount of electricity was 540 mAh/g (final voltage: 1.0 V).

Example 3

Copper oxide (CuO) (66.8 g), aluminum oxide ($Al_2O_3$) (21.4 g) and boron oxide ($B_2O_3$) (14.6 g) were mixed and the mixture was calcined in an air at 1,000° C. for 2 hours. The obtained powder had an average particle size of about 1.5 $\mu$m. According to the X-ray diffraction analysis, it was found that the product was $Cu_2AlBO_5$.

A coin type lithium cell was produced in the same manner as in Example 1 except that $Cu_2AlBO_5$ prepared in the above was used as a positive electrode-active material.

With the produced cell of Example 3, the discharge characteristics were measured under the same conditions as those in Example 1. The average voltage was 1.55 V, and the discharged amount of electricity was 420 mAh/g (final voltage: 1.0 V).

Example 4

Copper oxide (CuO) (57.3 g), gallium oxide ($Ga_2O_3$) (33.7 g) and boron oxide ($B_2O_3$) (12.5 g) were mixed and the mixture was calcined in an air at 1,000° C. for 2 hours. The obtained powder had an average particle size of about 1.5 $\mu$m. According to the X-ray diffraction analysis, it was found that the product was $Cu_2GaBO_5$.

A coin type lithium cell was produced in the same manner as in Example 1 except that $Cu_2GaBO_5$ prepared in the above was used as a positive electrode-active material.

With the produced cell of Example 4, the discharge characteristics were measured under the same conditions as those in Example 1. The average voltage was 1.65 V, and the discharged amount of electricity was 450 mAh/g (final voltage: 1.0 V).

Example 5

Copper oxide (CuO) (54.1 g), manganese oxide ($Mn_2O_3$) (26.8 g) and boron oxide ($B_2O_3$) (21.0 g) were mixed and the mixture was calcined in an air at 1,000° C. for 2 hours. The obtained powder had an average particle size of about 2.0 $\mu$m. According to the X-ray diffraction analysis, it was found that the product was $Cu_2MnBO_5$.

A coin type lithium cell was produced in the same manner as in Example 1 except that $Cu_2MnBO_5$ prepared in the above was used as a positive electrode-active material.

With the produced cell of Example 5, the discharge characteristics were measured under the same conditions as those in Example 1. The average voltage was 1.6 V, and the discharged amount of electricity was 500 mAh/g (final voltage: 1.0 V).

Example 6

Copper oxide (CuO) (54.1 g), nickel oxide ($Ni_2O_3$) (28.1 g) and boron oxide ($B_2O_3$) (21.0 g) were mixed and the mixture was calcined in an air at 1,000° C. for 2 hours. The obtained powder had an average particle size of about 2.0 $\mu$m. According to the X-ray diffraction analysis, it was found that the product was $Cu_2NiBO_5$.

A coin type lithium cell was produced in the same manner as in Example 1 except that $Cu_2NiBO_5$ prepared in the above was used as a positive electrode-active material.

With the produced cell of Example 6, the discharge characteristics were measured under the same conditions as those in Example 1. The average voltage was 1.7 V, and the discharged amount of electricity was 500 mAh/g (final voltage: 1.0 V).

Example 7

Copper oxide (CuO) (47.7 g) and molybdenum oxide ($MoO_3$) (57.6 g) were mixed and the mixture was calcined in an air at 700° C. for 2 hours. The obtained powder had an average particle size of about 1.5 $\mu$m. According to the X-ray diffraction analysis, it was found that the product was $Cu_3Mo_2O_9$.

A coin type lithium cell was produced in the same manner as in Example 1 except that $Cu_3Mo_2O_9$ prepared in the above was used as a positive electrode-active material.

With the produced cell of Example 7, the discharge characteristics were measured under the same conditions as those in Example 1. The average voltage was 1.9 V, and the discharged amount of electricity was 380 mAh/g (final voltage: 1.0 V).

Figure 2:
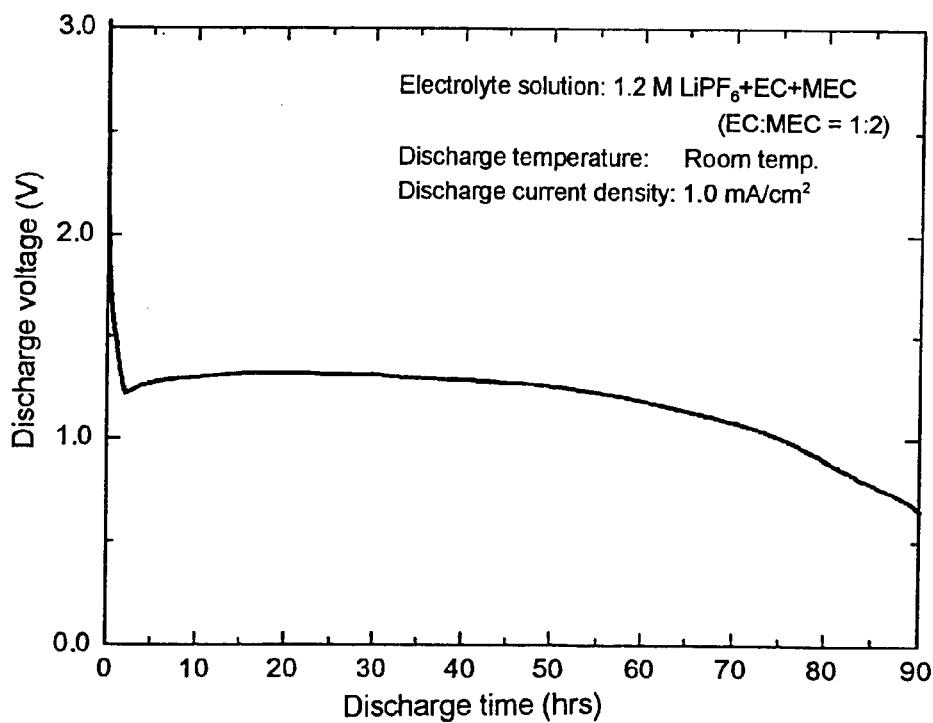
FIG. 2 is a graph showing the discharge characteristics of the cell produced in Comparative Example 1 comprising CuO as a positive electrode-active material.

The discharge characteristics of the cell of Example 7 are shown in FIG. 2.

Example 8

Copper oxide (CuO) (35.8 g) and molybdenum oxide ($MoO_3$) (64.8 g) were mixed and the mixture was calcined in an air at 800° C. for 2 hours. The obtained powder had an average particle size of about 1.5 $\mu$m. According to the X-ray diffraction analysis, it was found that the product was $CuMoO_4$.

A coin type lithium cell was produced in the same manner as in Example 1 except that $CuMoO_4$ prepared in the above was used as a positive electrode-active material.

With the produced cell of Example 8, the discharge characteristics were measured under the same conditions as those in Example 1. The average voltage was 1.8 V, and the discharged amount of electricity was 370 mAh/g (final voltage: 1.0 V).

Example 9

Copper oxide (CuO) (55.7 g) and molybdenum oxide ($MoO_3$) (50.4 g) were mixed and the mixture was calcined in an air at 800° C. for 2 hours. The obtained powder had an average particle size of about 1.5 $\mu$m. According to the X-ray diffraction analysis, it was found that the product was $Cu_2MoO_5$.

A coin type lithium cell was produced in the same manner as in Example 1 except that $Cu_2MoO_5$ prepared in the above was used as a positive electrode-active material.

With the produced cell of Example 9, the discharge characteristics were measured under the same conditions as those in Example 1. The average voltage was 1.85 V, and the discharged amount of electricity was 375 mAh/g (final voltage: 1.0 V).

Example 10

Copper oxide (CuO) (55.7 g) and boron oxide ($B_2O_3$) (48.7 g) were mixed and the mixture was calcined in an air at 900° C. for 2 hours. The obtained powder had an average particle size of about 1.5 $\mu$m. According to the X-ray diffraction analysis, it was found that the product was $CuB_2O_4$.

A coin type lithium cell was produced in the same manner as in Example 1 except that $CuB_2O_4$ prepared in the above was used as a positive electrode-active material.

With the produced cell of Example 10, the discharge characteristics were measured under the same conditions as those in Example 1. The average voltage was 1.55 V, and the discharged amount of electricity was 400 mAh/g (final voltage: 1.0 V).

Figure 6:
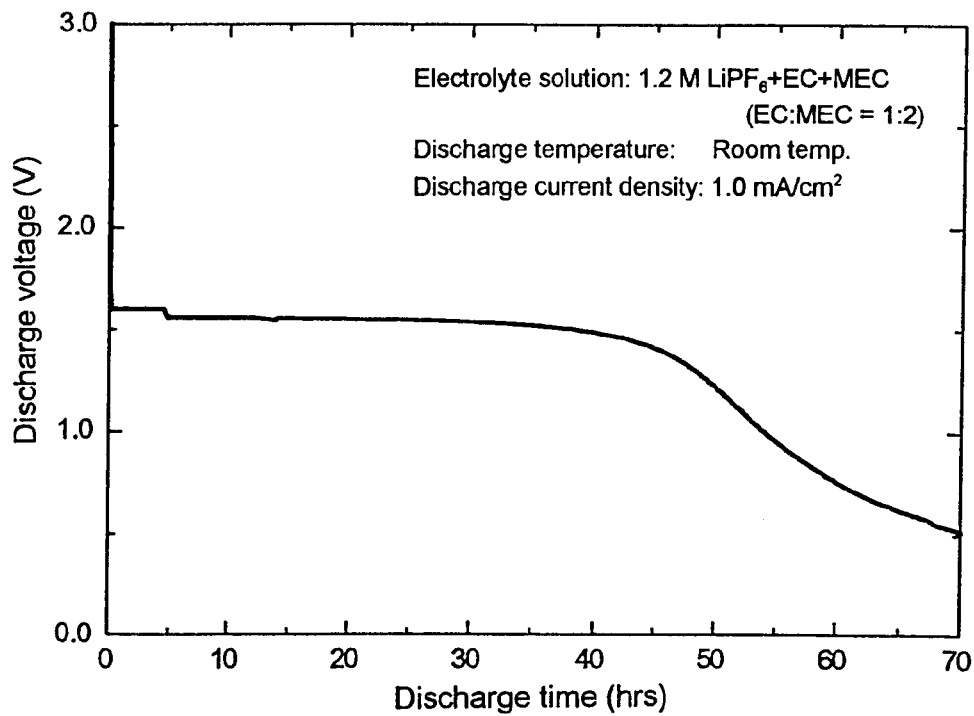
FIG. 6 is a graph showing the discharge characteristics of the cell produced in Example 10 comprising $CuB_2O_4$ as a positive electrode-active material.

The discharge characteristics of the cell of Example 10 are shown in FIG. 6.

Example 11

Copper oxide (CuO) (35.8 g) and manganese oxide ($Mn_2O_3$) (71.0 g) were mixed and the mixture was calcined in an air at 900° C. for 2 hours. The obtained powder had an average particle size of about 1.5 μm. According to the X-ray diffraction analysis, it was found that the product was $CuMn_2O_4$.

A coin type lithium cell was produced in the same manner as in Example 1 except that $CuMn_2O_4$ prepared in the above was used as a positive electrode-active material.

With the produced cell of Example 11, the discharge characteristics were measured under the same conditions as those in Example 1. The average voltage was 1.5 V, and the discharged amount of electricity was 370 mAh/g (final voltage: 1.0 V).

Example 12

Copperoxide (CuO) (47.7 g) andaluminumoxide ($Al_2O_3$) (61.2 g) were mixed and the mixture was calcined in an air at 1,000° C. for 2 hours. The obtained powder had an average particle size of about 1.5 μm. According to the X-ray diffraction analysis, it was found that the product was $CuAl_2O_4$.

A coin type lithium cell was produced in the same manner as in Example 1 except that $CuAl_2O_4$ prepared in the above was used as a positive electrode-active material.

With the produced cell of Example 12, the discharge characteristics were measured under the same conditions as those in Example 1. The average voltage was 1.45 V, and the discharged amount of electricity was 375 mAh/g (final voltage: 1.0 V).

Example 13

Copper oxide (CuO) (31.8 g) and gallium oxide ($Ga_2O_3$) (75.0 g) were mixed and the mixture was calcined in an air at 1,000° C. for 2 hours. The obtained powder had an average particle size of about 1.5 μm. According to the X-ray diffraction analysis, it was found that the product was $CuGa_2O_4$.

A coin type lithium cell was produced in the same manner as in Example 1 except that $CuGa_2O_4$ prepared in the above was used as a positive electrode-active material.

With the produced cell of Example 13, the discharge characteristics were measured under the same conditions as those in Example 1. The average voltage was 1.5 V, and the discharged amount of electricity was 385 mAh/g (final voltage: 1.0 V).

Comparative Example 1

A coin type lithium cell was produced in the same manner as in Example 1 except that CuO was used as a positive electrode-active material.

With the produced cell of Comparative Example 1, the discharge characteristics were measured under the same conditions as those in Example 1. The average voltage was 1.2 V, and the discharged amount of electricity was 600 mAh/g (final voltage: 1.0 V).

The discharge characteristics of the cell of Comparative Example 1 are shown in FIG. 2.

From the comparison of the discharge characteristics of the cell of Example 1 shown in FIG. 1 and that of the cell of Comparative Example 1 shown in FIG. 2, it can be seen that the cell of Example 1 had the higher discharge voltage than that of Comparative Example 1 and generated a high voltage.

As can be seen from the results of the measurements of the discharge voltage, the cells of Examples 2 to 6 had the average voltage in the range between 1.5 V and 1.7 V, which is higher than an average voltage of 1.2 V generated by the cell of Comparative Example 1.

Reference Example 1

A coin type lithium cell was produced in the same manner as in Example 1 except that $B_2O_3$ was used as a positive electrode-active material.

Figure 3:
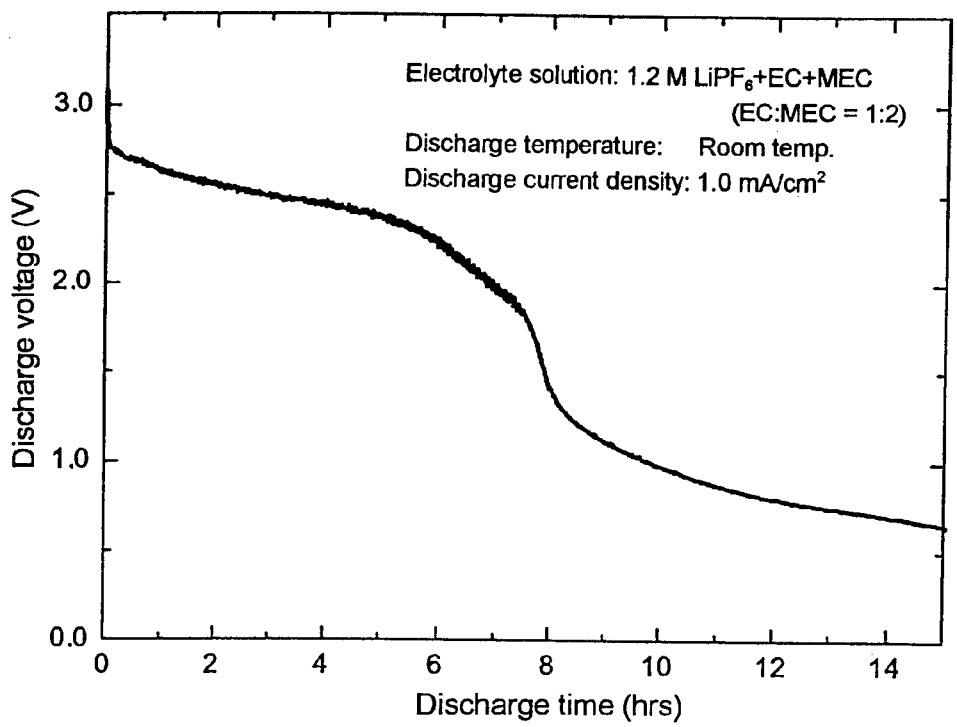
FIG. 3 is a graph showing the discharge characteristics of the cell produced in Reference Example 1 comprising $B_2O_5$ as a positive electrode-active material.

With the produced cell of Reference Example 1, the discharge characteristics were measured under the same conditions as those in Example 1. The discharge characteristics of this cell are shown in FIG. 3.

The cell of Reference Example 1 generated a high voltage in the initial stage of discharging, but the discharging time was shorter than the cell of Example 1, and so on. Therefore, the cell of Reference Example 1 did not have a high capacity, and lacked the flatness of the discharge voltage.

Reference Example 2

A coin type lithium cell was produced in the same manner as in Example 1 except that $MoO_3$ was used as a positive electrode-active material.

Figure 4:
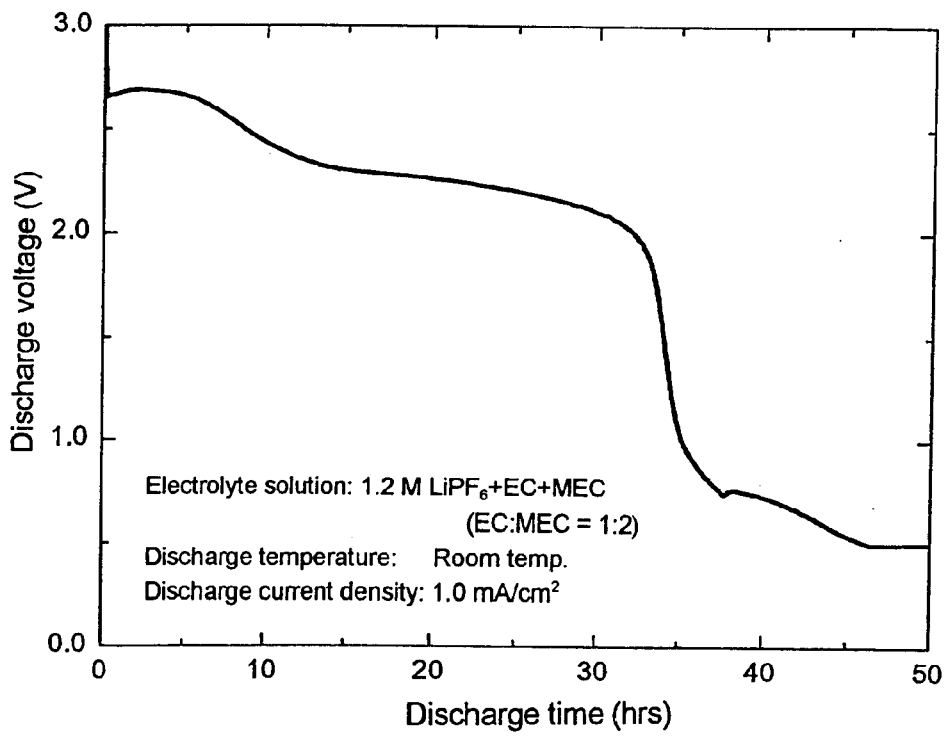
FIG. 4 is a graph showing the discharge characteristics of the cell produced in Reference Example 2 comprising $MoO3$ as a positive electrode-active material.
Figure 5:
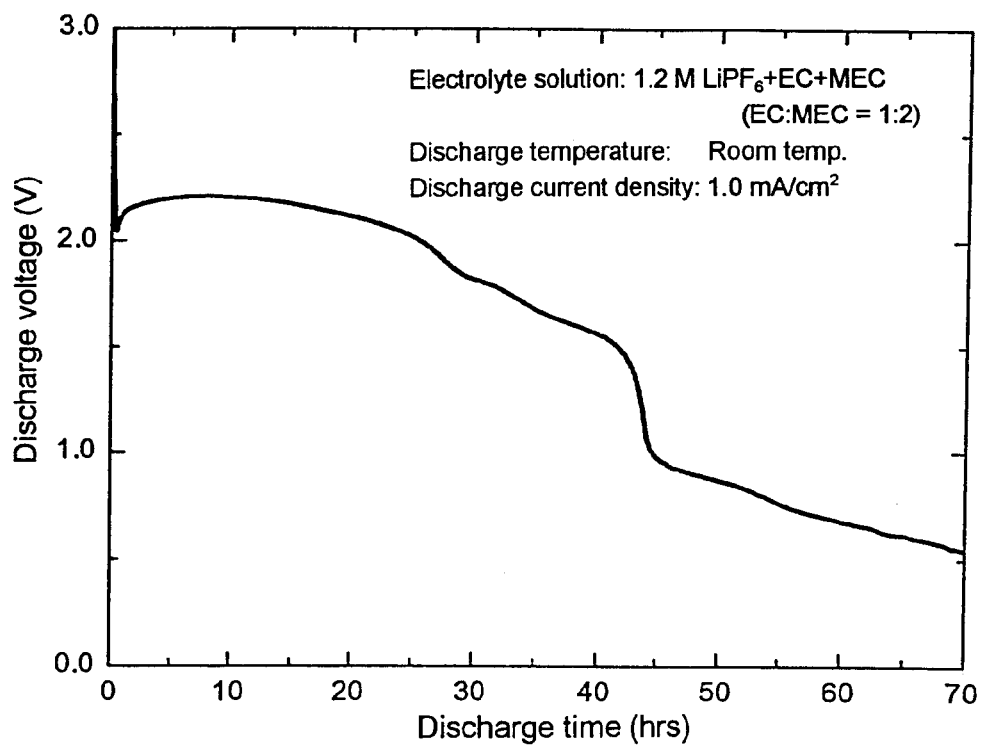
FIG. 5 is a graph showing the discharge characteristics of the cell produced in Example 7 comprising $Cu_3Mo_2O_9$ as a positive electrode-active material.

With the produced cell of Reference Example 2, the discharge characteristics were measured under the same conditions as those in Example 1. The discharge characteristics of this cell are shown in FIG. 4.

The cell of Reference Example 2 generated a high voltage in the initial stage of discharging, but the discharging time was shorter than the cell of Example 1, and so on. Therefore, the cell of Reference Example 2 did not have a high capacity, and lacked the flatness of the discharge voltage.

In comparison with the cells of Reference Examples which are expected to achieve the high voltage, the cells of Examples 1 to 6 according to the present invention had the high capacity in the range between 420 and 550 mAh/g, as can be seen from the results of the measurement of the discharged amount of electricity.

What is claimed is:

1. A positive electrode-active material consisting of at least one compound selected from the group consisting of a copper-boron double oxide of the formula:

$$Cu_jM_kB_mO_n \qquad (I)$$

wherein M is a metal atom, and j, k, m and n are each a positive integer, a copper-molybdenum double oxide of the formula:

$$Cu_xMo_yO_z \qquad (II)$$

wherein x, y, and z are each a positive integer, and a copper double oxide of the formula:

$$CuM'_2O_4 \qquad (III)$$

wherein M' is at least one element selected from the group consisting of B, Al, Ga, Co, Ni and a rare earth element.

2. The positive electrode-active material according to claim 1, wherein M in the formula (I) is at least one metal atom selected from the group consisting of Fe, Al, Ga, In, Tl, Sc, Mn, Ni, Co and rare earth elements.

3. The positive electrode-active material according to claim 1, which consists of a compound of the formula (I) wherein j is 2, k is 1, m is 1 and n is 5.

4. The positive electrode-active material according to claim 3, wherein said compound of the formula (I) is at least one compound selected from the group consisting of $Cu_2FeBO_5$, $Cu_2AlBO_5$ and $Cu_2GaBO_5$.

5. The positive electrode-active material according to claim 1, wherein said compound of the formula (II) is $Cu_3Mo_2O_9$.

6. A lithium cell comprising a positive electrode comprising an active material according to any one of claims 1 to 5, a lithium negative electrode, and an electrolyte solution.

* * * * *